United States Patent

[11] 3,616,150

[72] Inventor Robert Borge
 Lynbrook, N.Y.
[21] Appl. No. 693,184
[22] Filed Dec. 26, 1967
[45] Patented Oct. 26, 1971
[73] Assignee Deering Milliken Research Corporation
 Spartanburg, S.C.

[54] LAMINATED ARTICLE
 6 Claims, No Drawings

[52] U.S. Cl. ........................................ 161/89,
 156/291, 161/148
[51] Int. Cl. ........................................ B32b 7/14,
 D06m 17/00
[50] Field of Search ............................ 161/89, 72,
 97, 98, 148, 175, 181; 66/190; 2/46, 69; 156/290,
 291

[56] References Cited
UNITED STATES PATENTS

| | | | |
|---|---|---|---|
| 3,007,227 | 11/1961 | Moler | 161/181 X |
| 1,993,470 | 3/1935 | Winship | 161/72 |
| 3,257,262 | 6/1966 | Epstein | 161/89 |
| 3,301,740 | 1/1967 | Stiehl et al. | 161/89 X |
| 3,383,263 | 5/1968 | Storti | 161/97 X |
| 3,399,108 | 8/1968 | Olson | 161/175 X |
| 3,444,035 | 5/1969 | Bushnell | 161/89 X |

*Primary Examiner*—William A. Powell
*Attorneys*—Norman C. Armitage and H. William Petry

ABSTRACT: A laminated article comprising an outer layer of a textile fabric and an inner layer of a knitted fabric prepared from a spun yarn, said layers being bonded together with an adhesive. These laminated articles exhibit improved thermal properties.

3,616,150

LAMINATED ARTICLE

BACKGROUND OF THE INVENTION

This invention relates to laminated articles, and more particularly to laminated articles having improved hand, drape and thermal properties. The invention further relates to a laminated fabric composition comprising an outer layer of a textile fabric and an inner layer of a knitted fabric prepared from a spun yarn, the layers being bonded together with an adhesive.

The necessity for omen having wearing insulating properties generally results in the use of heavier fabrics, and especially heavy woolen fabrics. Wool fabrics have been utilized for this purpose because of their very desirable insulating properties. A disadvantage, however, is that coats and other articles of earing apparel prepared from heavy weight wool fabrics are bulky and heavy, and therefore, objectionable, especially to women who desire light coats. Other fabric materials such as cotton and the well-known synthetic materials such as the polyesters and polyamides are not known for their insulating properties, and the synthetics generally develop a displeasing hand when subjected to low temperatures.

The use of laminated fabrics for the preparation of wearing apparel and other textile articles has increased significantly in recent years. This interest in laminated fabrics has been generated by the unusual and desirable properties exhibited by such fabrics. For example, it is possible to prepare wearing apparel from a combination of two or more types of fabrics and obtain the desirable properties of each of the fabrics in a single garment. Such results are not obtained when two or more fabrics are combined by sewing since there is little or no interaction between the successive layers which have been sewn. Moreover, the necessary separate cutting and sewing steps involved in these processes add to the complexity and expense of the operation.

These problems have been overcome to some extent by bonding the successive layers together with an adhesive. In this manner, there is considerable interaction between the layers resulting in improved properties such as drape and wrinkle resistance. In some instances, however, even the bonded laminated fabrics do not exhibit all the desirable properties. It has been found, for example, that a laminated fabric obtained by bonding two similar fabrics such as woven fabrics, possess a considerable propensity for wrinkling due to the apparently uneven distortion of the two layers. Such uneven distortions result from nonuniform bonding of the two layers as well as reaction to the environment, especially to moisture and heat.

The unique advantages of laminated fabrics are maximized when a knitted fabric is combined with knitted or woven fabrics, and especially when a knitted fabric is combined with a woven fabric. The laminated fabric possesses all the desirable properties of a woven fabric and the additional improved drape characteristics imparted by the bonded knitted fabric. Knitted fabrics are characterized by being expandable in several directions, and, therefore, are extremely useful as backing or lining material which should expand or contract to conform to the changes in the outer material.

It has been known to prepare wearing apparel from laminated fabrics prepared by laminating a layer of foam such as a urethane foam to a fabric. These laminated fabrics have been widely used in the preparation of coats and other garments for use in cold weather. Foams, of course, are well known insulators and it is not too surprising, therefore, that a foam-laminated fabric is a warm fabric.

SUMMARY OF THE INVENTION

It THE PREFERRED now been discovered that a fabric having improved thermal properties can be prepared by bonding an outer layer of a textile fabric to an inner layer of a knitted fabric prepared from a spun yarn.

DESCRIPTION OF THE PREFERRED EMBODIMENTS

The outer layer of terephthalate; laminated article can be either a woven, knitted or non-woven fabric comprised of natural fibers, synthetic fibers, and blends thereof. The natural fibers include the cellulosic and protein fibers such as cotton, flax, ramie, wool, alpaca, vicuna, mohair, cashmere, camel hair, Llama, fur and silk. Examples of synthetic fibers include polyamides, such as polyhexamethylene adipamide, polyesters such as polyethylene terephthalate; acrylic fibers such as acrylonitrile, homopolymers or copolymers of acrylonitrile, such as acrylonitrile/methyl acrylate (85:15) and cellulosic derivatives such as cellulose acetate and viscose rayon. Examples of fabrics composed of blends of natural and synthetic fibers include the following: Fortrel polyester/cotton (50:50) Dacron polyester/cotton (65:35); Dacron polyester/wool (65:35); and acrilan/wool (55:45).

The preferred fabric for use as the outer layer of the laminated article of this invention is a woven fabric and more particularly a woven wool fabric. Knitted fabrics such as the Raschel fabrics are also particularly useful since a wide variety of styles and weights can be prepared by the Raschel process.

The inner layer utilized in the preparation of the laminated articles of this invention are knitted fabrics obtained from spun yarns. The use of spun yarns results in a laminated fabric having unexpectedly superior insulating properties. For example, it has been found that a laminated fabric comprised of a layer of a wool fabric and a layer of a knitted spun cotton fabric possesses all of the desirable properties of a satisfactory fabric and unusually high-insulating properties. That is, the laminated fabric is as good an insulator or better than an equivalent weight of the woolen fabric alone. This is especially surprising since cotton is not known to be a good insulator material.

Natural and synthetic fibers may be utilized in the preparation of the inner knitted fabric. Such fibers include cellulosic products such as cotton, rayon, viscose rayon, nylon polyester, polyamide, and cellulose acetate. Fabrics such as acetate tricot, nylon tricot and rayon tricot are useful inner fabrics although the spun yarn cellulosic fabrics are preferred. Raschel, jersey, circular or tubular knit fabrics are also useful in the preparation of the laminates of this invention.

The inner and outer layers of fabric are bonded together by any of the adhesives known to those skilled in the art. The choice is determined by the properties desired and the end use of the laminate. For example, laminates which are to be washable are generally bonded with an adhesive which is capable of withstanding such treatments. The adhesive may be applied to the fabrics as a liquid or many be applied in the form of threads or nonwoven fabrics which are thermoplastic and possess latent adhesive properties. Elastomers which are soluble or dispersible in a liquid carrier are especially useful and these include those elastomers prepared from acrylates, urethanes and vinyl acetates. Polyurethane adhesive are solvent based and are cured at room temperature. On the other hand, acrylic adhesives are water based and are cured at elevated temperatures, usually from one to three minutes at 120–150Φ½ C.

In the process of this invention, the adhesive is preferably applied to portions only of the meeting surfaces of the fabrics to be laminated, although the adhesive may be applied as a continuous layer or film. Discontinuous patterns such as checker board or plaidlike patterns are contemplated also. Alternatively, the adhesive composition may be applied in the form of substantially discrete nodules or blotches.

The adhesive can be applied to one or both of the fabrics to be laminated by any of the known methods such as from a blanket or belt, gravure rollers, or through a spray. Of these methods, the gravure roll and spray techniques are preferred for applying adhesive in some predetermined pattern of dots, squares, blotches, stripes, etc. The thickness of the applied adhesive may vary from 0.003 to about 0.030 inches. One important aspect of the application of the adhesive is the rheology of the adhesive itself. The rheology of adhesives can be varied by the use of different thickening agents. Self-reactive acrylic resins can be thickened by the addition of a methyl cellulose such as Methocel 4,000 (available from Dow Chemical Company). This is an inert neutral thickener which does not inhibit cross-linking of the acrylic emulsion. Also useful as thickeners are acid containing acrylic emulsions which thicken on the addition of a basic substance such as ammonia.

The amount of adhesive applied to the fabric is not critical although enough adhesive should be supplied to provide a satisfactory bond between the layers of the laminate. Generally about 2.5 to about 25 percent by weight of the adhesive based on the weight of the fabric is used.

The fabric layers are bonded together by applying the adhesive to either or both of the fabrics and thereafter pressing the layers together by any known method such as by passing the fabric through a nip roller. The laminated fabric is then passed into a drying unit which will vary according to the type of adhesives used. If polyurethane adhesives are used, all that is required is sufficient heat to drive off the solvent and a simple hot air oven will suffice. When acrylics are used, more heat is required since the water must first be driven off and then the adhesive cured. Also, since acrylic adhesives are water based and generally low tack adhesive it is usually necessary to ensure that the two layers of fabric cannot move in relation to each other until all or most of the water has been driven off. Because of this, drum and belt dryers are preferred.

The fabrics which comprise the layers of the laminates of this invention may be chemically treated by the methods known in the art to provide the product with desirable supplemental properties such as the ability to resist soiling and water. For example the fabrics, either before or after laminating may be treated with resins such as the fluorocarbon and silicone resins to render the product water and soil resistant. It is also known, as described in copending application, Ser. No. 683,219, now u.s. pat. No. 3,539,573, to bond the fabrics before dyeing. In this manner, one can obtain any desired color matching and the necessity of accumulating a sizable inventory of various colored fabrics is alleviated. The following examples illustrate the laminated articles of this invention and the process for preparing said articles. Unless otherwise indicated, all parts and percentages are by weight.

EXAMPLE 1

A 60-inch wide woven fabric (10 ounce/linear yard) composed of a blend of 85 parts of wool and 15 parts of Nylon is laminated to a 60–67-inch wide spun Nylon tricot (11 yards/pound) with an adhesive comprising polyvinyl acetate, dioctyl phthalate plasticizer and citric acid as a catalyst. The adhesive is applied in the form of a checker board pattern, and the fabrics are pressed together between the cans of a laminator maintained at a temperature of about 125° C. while travelling at the rate of 12 yards per minute. The laminated fabric is then cured for 1 to 2 minutes at 150° C.

EXAMPLE 2

A 60-inch wide, woven, all-wool fabric (10 ounce/linear yard) is laminated to a 60–65-inch wide spun white acetate tricot utilizing the adhesive described in example 1 applied in the form of dots. The two fabrics are brought together in a laminator travelling at 15 yards per minute at a roll temperature of 150°–160° C.

EXAMPLE 3

The procedure of example 2 is repeated except that the acetate tricot fabric is replaced by a knitted fabric prepared from spun viscose rayon yarn.

EXAMPLE 4

A 60-inch wide, 100 percent all-wool fabric as described in example 2 is laminated to a jersey knit cotton fabric (65–67 inches wide and 3 yards/pound) utilizing an acrylate adhesive prepared by mixing 400 parts of Rhoplex E-358 (a 60 percent solids, self-cross-linking acrylic emulsion available from the Rhom & Haas Company), 8 parts of an acid-containing acrylic emulsion copolymer, also available from Rohm & Haas Company under the tradename ACRYSOL ASE-95, 8 parts of ACRYSOL ASE-60, (a thickener available from Rohm & Haas Company), 5.5 parts of diammonium hydrogen phosphate, and 0.5 parts of a silicone antifoam agent in 41 parts of water. The adhesive is applied in the form of dots which are flattened out as the two layers of fabric are brought together and laminated in a laminator travelling at 12 yards per minute at a roll temperature of 118° C. The laminated fabric is then cured for about two minutes at 145° C., and the excess knit fabric is trimmed off.

EXAMPLE 5

The procedure of example 1 is repeated except that the laminate is prepared from a woven 100 percent acrilan fabric and a jersey knit cotton fabric (67 inches wide and 44 yards/pound).

EXAMPLE 6

The procedure of example 4 is repeated except that the outer layer of the laminate is a knitted cotton and the inner layer is a knitted viscose rayon.

As mentioned previously, the laminated articles of this invention, having an outer layer of a textile fabric and an inner layer of a knitted fabric prepared from a spun yarn, exhibit unusually high insulation properties. It has been observed, for example, that a laminated fabric composed of a 10-ounce woven wool fabric and an 8-ounce jersey knit cotton fabric bonded together with an adhesive applied in distinct dots is as good a thermal insulator or better than an 18-ounce woven wool fabric. Moreover, laminated fabrics having an inner layer prepared from spun yarn exhibit improved hand when compared to laminates having an inner fabric of a filament yarn.

That which is claimed:

1. A laminated article having improved thermal properties and drape comprising an outer layer of a woven or knitted wool fiber-containing fabric and an inner layer of a knitted cellulosic fabric prepared from a spun yarn, said layers being bonded together with an adhesive.

2. The laminated article of claim 1 wherein the outer layer of fabric is a woven wool fabric.

3. The laminated article of claim 1 wherein the inner layer is a knitted cotton fabric.

4. The laminated article of claim 1 wherein the inner layer is a jersey knit cotton fabric.

5. The laminated article of claim 1 wherein the inner layer is an acetate tricot fabric.

6. The laminated article of claim 1 wherein the adhesive is applied to portions only of the meeting surfaces of the fabrics.